United States Patent Office 3,164,743
Patented Jan. 5, 1965

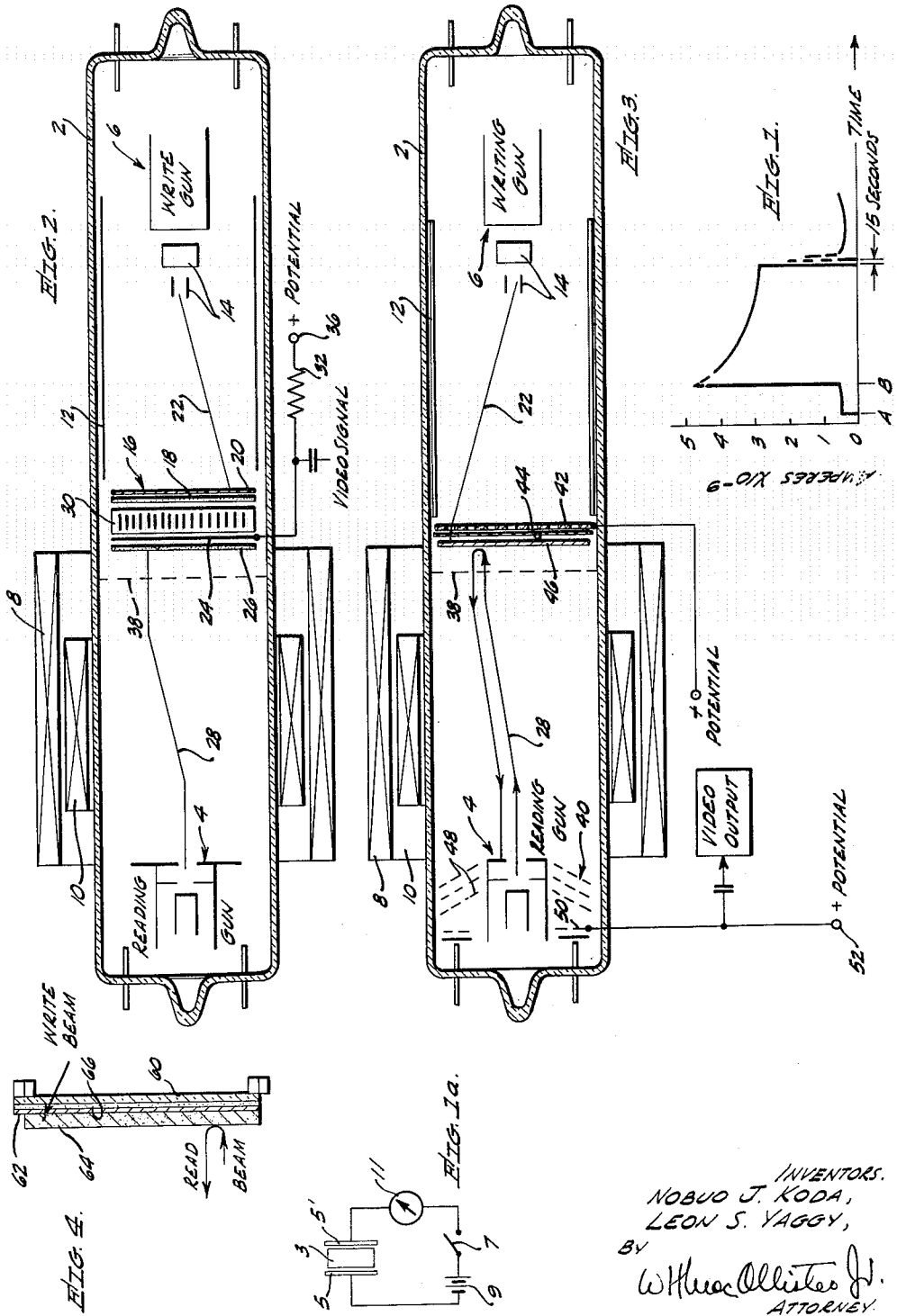

3,164,743
SCAN-CONVERSION CATHODE RAY TUBE HAVING A PHOTOCONDUCTOR STORAGE ELEMENT OF THE FIELD-SUSTAINED CONDUCTIVITY TYPE
Nobuo J. Koda, Vista, and Leon S. Yaggy, North Carlsbad, Calif., assignors to Hughes Aircraft Company, Culver City, Calif., a corporation of Delaware
Filed Feb. 21, 1962, Ser. No. 174,775
6 Claims. (Cl. 315—8.6)

This invention relates to cathode ray tubes, particularly of the type utilizing a storage target whereby electrical signals of one pattern may be produced from electrical signals of a different pattern. More particularly, the present invention relates to cathode ray tubes of the "scan-conversion" type whereby electrical signals representing a scanning pattern of one frequency can be converted into electrical signals representing a scanning pattern of a different frequency.

Scan-conversion cathode ray tubes are useful, for example, where it is desired to present a radar-type display at television scan frequencies. One way of doing this, of course, it to derive the necessary television video signals by viewing the radar display directly with a television camera or pick-up tube. However, the loss of detail and display resolution is so severe that this method is not very useful. Ideally, one would supply the television transmitter with the electrical signals representing the radar display. However, the radar signals are derived by a different and an extensively slow scanning frequency in comparison with television scanning frequencies. For example, the known P.P.I. radar scan has a cycle time of about 10 seconds; television-type scans have a cycle time of 1/30 of a second.

It will therefore be appreciated that a suitable electronic or electrical scan-conversion system must employ some means for storing the slower scan signals while deriving the faster scan signals corresponding thereto. Cathode ray tubes capable of performing such a function have been provided heretofore but have been characterized by some rather undesirable features. In general scan-conversion tubes of the prior art have utilized a storage target comprising a perforated conducting screen having on one side a coating of secondary emissive dielectric material. This target is disposed between a pair of opposed electron guns, one of which, called the "writing" gun, scans the coated side of the target at one scan frequency to thereby and thereon establish a stored charge pattern by secondary emission representative of the input signals; the other gun, called the "reading" gun, scans the uncoated side of the target at a different scan frequency and, in effect, restores the storage target to a pre-determined potential level by replacing the secondarily emitted electrons, the electron current being required to do this varying with the stored charge pattern. The varying electron current of the "reading" beam may thus be utilized to provide an electrical output signal corresponding to the charge pattern and hence the original input signals. Such a tube is shown and described in U.S. Patent No. 2,547,638 to B.C. Gardner. Another type of cathode ray tube for achieving the same function but employing only one electron gun and an imperforate plate having a secondary electron emissive coating thereon is the so-called "barrier grid storage tube." Such a tube is shown and described in U.S. Patent No. 2,454,410 to R. L. Snyder, Jr.

Among some of the disadvantages of the prior art "scan-conversion" tubes is the fact that the number of times a given "stored" image can be read out is severly limited. In single gun tubes the "input" (writing) function must be attenuated in time with the "output" (reading) function. Direct "feed-through" of some of the input signal to the output often occurs. In the case of tubes employing a perforated target structure, such as in the aforementioned Gardner patent, the resolution of the image is severely limited by the supporting mesh of the storage target screen.

It is therefore an object of the present invention to provide an improved storage target for cathode ray tubes.

Another object of the invention is to provide an improved storage target for cathode ray tubes of the signal or scan-conversion type.

These and other objects and advantages of the invention are realized by providing a target having a special photoconductor storage element in a cathode ray tube intermediate a pair of opposed electron guns. The special photoconductor storage element is one which is characterized by sustained conductivity after exciting radiation is no longer present. The special storage element of the present invention is called herein a "photoconductor" since it does belong to the class of devices and materials capable of becoming conductive under the influence of optical energy. However, as will be shown hereinafter, the operation of the storage target of the invention is not limited to applications wherein the mechanism of optical excitation is utilized to achieve sustained conductivity. Hence, the terms, "photoconductor" or "photoconduction" are used advisedly herein to refer to materials and phenomena which are capable of excitation by the application of electromagnetic energy thereto and which are not necessarily exclusively limited to optical excitation.

The invention will be described in greater detail by reference to the drawings in which:

FIGURE 1 is a graph illustrating the sustained conductivity characteristics of a photocoductor material in accordance with the invention; and FIGURE 1a is a schematic circuit arrangement whereby the characteristics shown in FIGURE 1 may be more conveniently explained and understood; and FIGURE 2 illustrates, partly in section, a cathode ray tube constructed in accordance with one embodiment of the invention;

FIGURE 3 illustrates, partly in section, a cathode ray tube constructed in accordance with another embodiment of the invention;

FIGURE 4 illustrates in prospective and partly in section, a storage target constructed in accordance with one embodiment of the invention.

Referring now to FIGURES 1 and 1a, a photoconductor 3 according to the invention is shown schematically disposed between a pair of plates 5, 5', which are connected in series with a switch 7, a source of potential 9, and an ammeter 11. When the switch 7 is closed (Point A in FIGURE 1) an electric field is established across the photoconductor and a dark photo-current of less than $0.5 \times 10^{-9}$ amperes flows through the circuit. When the photoconductor 3 is subjected to excitation by light, for example, the photo-current rises abruptly to a value above $4.0 \times 10^{-9}$ amperes and thereafter slowly drops off to about $3.0 \times 10^{-9}$ amperes. As shown by FIGURE 1 the photocurrent remains at or above $3.0 \times 10^{-9}$ amperes for well over ten minutes. At Point C, at which the switch 7 is opened, the photo-current drops to zero value. At Point D, fifteen seconds later, when the switch 7 is again closed with the photoconductor unilluminated, the "dark" photo-current value is again less than $0.5 \times 10^{-9}$ amperes, thus demonstrating that the field-sustained conductivity characteristic of the photoconductor is indeed controllable and may be established at will for substantial periods of time. By "sustained conductivity" is meant the ability to remain conductive under the influence of an electric field and when subjected to electromagnetic energy, which is generally light, after cessation or removal of the exciting energy. An example of such a photoconductor is arsenic tri-selenide with an excess of arsenic. While photoconductor materials have heretofore been well known, the field-sustained conductivity thereof has not been particularly significant after removal or cessation of the exciting energy. In materials which have exhibited substantial conductivity for the length of time desired, the conductivity was not controllable by an electric field across the photoconductor. Consequently the erasure characteristic was poor.

Referring now to FIGURE 2, a cathode ray tube is shown comprising a tubular envelope 2 of electrically insulating material such as glass, for example, in the opposite ends of which are disposed a pair of conventional electron guns 4 and 6 which may be termed the "reading" and "writing" guns respectively. Also shown schematically are a focusing means or coil 8 and a deflection means or coil 10 for the "reading" gun 4, as well as focusing means 12 and deflection means or plates 14 for the "writing" gun 6. As these components and their operation and functions are well-understood in the art of electron optics further detailed description thereof is not deemed necessary herein. It should be understood that the focusing and deflection means could be either electromagnetic or electrostatic, as is well known, and some advantage such as isolation of operation may be realized by utilizing electromagnetic focusing and deflecting means for one gun and corresponding electrostatic means for the other gun as suggested schematically in FIGURE 2.

About intermediate the length of the tubular envelope 2 a target structure 16 is disposed. The target structure 16 comprises three functionally distinct sections: an input section 18–20, an output section 24–26, and a support and/or coupling section 30, for the input and output sections. The input section comprises a phosphor layer 18 having an electron transparent light reflecting film 20 thereon arranged to "face" the "writing" gun 6 so that the "writing" beam 22 may be caused to scan the phosphor layer 18 through the light reflecting film 20. The arrangement and nature of the input section 18–20 is similar to the phosphor screen arrangement in a conventional oscilloscope or kinescope in a television receiver, for example, except that the phosphor layer in those applications is generally disposed upon the end faceplate of the tube envelope. The phosphor film may be disposed on a separate light transparent support member 30 which may be of glass, for example. The light reflective, electron transparent film 20 may be a thin film of aluminum, for example, which is sprayed or otherwise disposed over the surface of the phosphor layer 18. The phosphor layer 18 may comprise any well known phosphor material such as silver-activated zinc sulfide which will produce light when impinged and excited by an electron beam, the intensity of the light thus produced being directly proportional to the intensity of the impinging electron beam.

The output section of the target structure 16 comprises a thin, light-transparent, electrically conductive film 24 and a photoconductive layer 26 arranged to "face" the "reading" gun 4 and to be scanned by the reading beam 28. The transparent conductive film 24 may be a thin film of $SnO_2$, for example, disposed on the surface of the light transparent support member 30 opposite to the input section. The photoconductive layer 26 comprises an evaporated photoconductor of sustained conductivity as described heretofore.

The light-transparent support and/or coupling member 30 may comprise a glass plate or the like. Since the input and output sections of the target structure 16 must be electrically isolated from each other in order to avoid crosstalk between the writing and reading signals, a glass plate of significant thickness, electrically, is in order. In the prior art tubes described previously, this electrical isolation has been accomplished by circuitry means which involved considerable complexity and equipment.

On the other hand, the light transmitted through such glass plate must not be subject to excessive diffusion and loss of contrast if resolution is to be retained. This would call for an extremely thin glass plate which might be mechanically difficult to provide and utilize, particularly for preventing crosstalk. Hence, while such a plate may be satisfactory for some applications of the present invention, a more desirable and preferred target structure would include a relatively thick, non-diffusing, light-transmitting, electrically non-conductive support or coupling member or optical lens 30 such as may be provided by the utilization of a fiber-optical component. Thus the plate or disk 30 may be made up of thousands of glass fibers, each about 0.001 inch in diameter, fused together and perpendicular to the plane parallel surfaces of the disk. The index of refraction of these glass fibers is such that the light incident on one face of the disk is transmitted or "piped" to the opposite face with little loss of resolution due to scattering. Such fiber-optic components are well known and the use thereof in conventional kinescope tubes is described in U.S. Patent No. 2,979,632 to S. M. MacNeille. As used herein the term "optical lens" is intended to include multiple fiber light transferring devices as well as unitary light transmitting elements such as a plate of glass. In either instance the optical lens should be substantially non-diffusing.

The tube may be operated in two modes of writing, one positive and the other negative. In the positive writing mode, a positive potential is maintained on the transparent conductive electrode film 24 and uniform negative potential is established on the photoconductor layer 26. This negative potential may be provided by scanning the photoconductor layer 26 with the "reading" beam 28 so as to charge this layer to the potential of the "reading" gun cathode.

The "writing" gun 6 is then intensely modulated in accordance with signals representing the information to be displayed. Also in accordance with these signals the "writing" beam 22 is deflected so as to scan the surface of the target 16 at a pre-determined frequency $(f_1)$. Such beam modulation and deflection are well-known and understood and hence will not be further described herein. The "writing" beam 22 thus excites the phosphor layer 18 into radiating optical or electromagnetic energy of wavelengths to which the photoconductor 26 in the output section is sensitive. This radiated energy which corresponds to the information to be displayed is "piped" without significant scattering through the coupling member 30 so as to impinge upon the photoconductor layer 26 which will become conductive in response thereto. The degree of conductivity established from point to point across the photoconductor layer 26 is dependent upon the intensity of the light impinging thereon which in turn is determined by the intensity of the "writing" beam 22 from point to point. In this manner a pattern comprising more or less conductive points corresponding to the information is established on or in the photoconductor layer 26. The uniform potential initially established on the photoconductor 26 will thereby drop from point to point depending on the degree of conductivity thereof. The photoconductor layer 26 is thereupon scanned at any desired frequency $(f_2)$ by the "reading" beam 28, which is held at constant current.

When the "reading" beam 28 falls on the photoconductor layer 26, electrons from the beam replace those which were conducted to the backplate 24 by the increased conductivity of the photoconductor layer, the number of electrons required from point to point thereon being determined by the extent or degree of the increase in conductivity. By replacing the electrons thus lost the beam restores the photoconductor layer 26 to the initial "reading" gun cathode potential. This replacement of electrons results in a capacitive flow of current through the signal resistor 32 which is connected in series between the backplate 24 and the potential source 34. This capacitive current flow is derived from the backplate 24 by means of a capacitor 36 connected to the lead between the backplate and the resistor 3.

It will therefore be understood that the magnitude of the signal current (and hence the output signal) is determined by the conductivity of the photoconductor layer 26 which in turn is determined by the intensity of the light output of the phosphor electrode 18, the intensity of the "writing" beam current, and hence the input signals applied to the "writing" beam gun intensity grid (not shown). Because of the storage capability of the target according to the present invention, the conductivity of the photoconductor layer 26 persists long after the phosphor layer 18 has ceased to fluoresce, and the output signal can be obtained again and again as the output beam scans the target.

For some purposes, particularly where selective erasure is desired, the positive writing mode may have some disadvantages. Thus the erasure of the charge pattern, obtained by variation in the input luminance, is obtained by breaking the gradient across the layer momentarily. This may be accomplished in the readout section of the tube by interrupting the beam which scans the target so that the surface reaches the backplate potential, due to the finite resistance of the layer. Another method for accomplishing this is to pulse the backplate by approximately 250 volts so that the beam impinging on the photoconductor surface does so with energy greater than the first crossover of the secondary emission curve. The surface then charges in a positive direction to, essentially, the potential of the decelerator electrode which is at approximately 280 volts. Charging the surface more positively than the backplate serves to reverse the electric gradient across the layer. In either case the operation is too slow for selective erasure type operation where the old information is erased just ahead of writing the new.

These difficulties may be avoided by utilizing a negative writing mode. In the tube, the readout beam current and target backplate potential are controlled so that the input luminance variation will override the charging effect of the beam in a controlled fashion. In other words, with a positive potential on the transparent conductive electrode film 24, the gradient across the photoconductor layer 26 is decreased because the conductivity of the layer due to the input light is so great the "reading" beam cannot maintain the original gradient across the layer 26. Also halftone level may be achieved by this controlled erasure process with the maximum input signal given by complete erasure to black or minimum conductivity state in the layer. While this mode of operation will give a negative display on the monitor, the polarity can be inverted so that the display is again positive.

An additional advantage of this negative writing mode is that controlled fade is possible. Thus, for example, a flood light on the photoconductor layer 26 can control the rate of fade of the stored information.

In FIGURE 3 another embodiment of a frequency-scan conversion tube according to the present invention is shown. In this tube the "reading" and "writing" guns 4 and 6, respectively, are disposed in an envelope 2 substantially identically as shown and described in connection with the embodiment of FIGURE 1. The present embodiment also includes the same provisions and arrangements as the embodiment of FIGURE 2 for deflection and focusing. In the embodiment of FIGURE 3, however, a different target arrangement is provided as well as a different manner for obtaining output signals therefrom. The target comprises an electroformed mesh screen 42 having a thin insulator film of bombardment induced conductivity material thereon (not shown) on the surface thereof "facing" the "writing" gun 6. Since the details and operation of such a target structure are shown and fully described in a co-pending application, S.N. 59,590, filed September 30, 1960, now U.S. Patent 3,086,139, in the name of N. H. Lehrer, and assigned to the instant assignee, no detailed description or explanation thereof is deemed necessary herein. Adjacent to and coextensive with the mesh target structure 42 is a thin metallic film electrode 44 which is substantially electron transparent. This electrode corresponds to the thin optically transparent electrode 24 shown and described in connection with the embodiment of FIGURE 2. A layer 46 of photoconductor material exhibiting sustained conductivity is also provided on the "reading" gun side of the target structure. The photoconductor layer 46, the thin film electrode 44, and the mesh screen 42, are shown as spaced from each other for convenience of illustration. Thus the thin film 44 may be mounted directly on the back of the screen member 42. The photoconductor layer 46 may then be disposed on the thin film layer 44.

Concentrically disposed around the "reading" gun 4 is a conventional electron multiplier section 40 comprising a number of perforated plates or screens 48 capable of emitting a plurality of secondary electrons upon impingement by primary electrons in a ratio of secondaries to primaries greater than unity. Each succeeding plate or screen has a successively higher potential. A terminal collection plate 50, is provided to collect or receive the secondary electrons emitted by the screens 48. This terminal plate or screen 50 is connected to a source of positive potential 52 to enhance this collection process. The signal output of the tube in this embodiment is derived through this electron multiplier section in order to eliminate or reduce "crosstalk" between the input and output sections of the tube which might occur due to the electrically "thin" isolation of the sections provided by the target structures just described.

In operation, the "reading" beam 28 is caused to scan the photoconductor layer 46 so as to establish a uniform negative potential thereon. The "writing" beam 22, which is intensity modulated in accordance with the information signals, then is caused to scan at a predetermined frequency ($f_1$) the bombardment induced conductivity target 42 which is initially at positive potential (by means of a connection to the positive potential source 54 from the mesh support screen). Depending on the intensity of the "writing" beam 22 various portions of the bombardment induced conductivity target 42 will become conductive and positively charged whereby the "writing" beam can penetrate the target 42 and the thin electron transparent electrode 44 and the photoconductor layer 46 which thereupon becomes conductive in response thereto, the degree of conductivity depending upon the intensity of the "writing" beam 22. The uniform negative potential initially established on the photoconductor layer 46 thus will drop (become less negative) from point to point to establish a change pattern corresponding to the input signals to the "writing" gun.

The photoconductor layer 46 is thereupon scanned by the constant current "reading" beam 26 at a desired frequency ($f_2$) which may be a television scan frequency. Electrons from this beam will either impinge upon the photoconductor layer 46 or will be repelled therefrom depending upon the negative potential pattern. Repelled electrons will thus be returned to the gun end of the tube to impinge upon the electron multiplier section 40 and eventually as an output signal therefrom. The storage of the charge pattern on the target will again depend on field-sustained conductivity as described previously.

Since the elimination of as many target structures as possible is desirable for the elimination or reduction of noise and to permit the employment of fewer and less complicated parts and components, a target structure such as shown in FIGURE 4 may be employed in the embodiment of the tube shown in FIGURE 3. Mechanical support for the bombardment induced conductivity layer 60, the electron-transparent film 62, and the photoconductor layer 64 is provided by a thin, meshless support membrane 66 which may be a layer of aluminum oxide about one micron in thickness.

There thus has been described a novel and useful storage target for cathode ray tubes particularly of the type for converting signals from one scanning frequency to a second scanning frequency.

What is claimed is:

1. A cathode ray tube comprising an envelope, a first electron gun disposed in said envelope for forming a first electron beam, a second electron gun disposed in said envelope for forming a second electron beam, a target assembly disposed in said envelope and including: (a) a photoconductor element, (b) means producing optical energy in response to impingement thereon by said first electron beam, (c) and means for applying said optical energy to said photoconductor; said photoconductor element being characterized by having at least two states of conductivity, the state of higher conductivity being established therein by electromagnetic energy applied to said photoconductor and being sustained therein for substantial periods of time by an electric field across said photoconductor, means for modulating said first electron beam and for scanning said means for producing said optical energy with said modulated electron beam at a first frequency, and means for scanning said photoconductor element with said second electron beam at a frequency different from said first frequency, and means for deriving output electrical signals from said tube in accordance with the states of conductivity in said photoconductor element.

2. The invention according to claim 1 wherein said means for producing said optical energy comprises an electron-responsive luminescent phosphor.

3. The invention according to claim 1 wherein said means for applying said optical energy to said photoconductor element comprises a substantially non-diffusing optical lens.

4. The invention according to claim 1 wherein said means for applying said optical energy to said photoconductor element comprises a fiber-optic element.

5. The invention according to claim 1 wherein said target assembly comprises a substantially non-diffusing optical lens, said means for producing said optical energy comprises a layer of electron-responsive luminescent phosphor material, and said photoconductor element comprises a layer of photoconductive material, said layers being supported by said optical lens at opposite surfaces thereof.

6. A cathode ray tube comprising an envelope, a first electron gun disposed in said envelope for forming a first electron beam, a second electron gun disposed in said envelope for forming a second electron beam, a target assembly disposed in said envelope and including a photoconductor element and a bombardment-induced-conductivity element, said photoconductor element being characterized by having at least two states of conductivity, the state of higher conductivity being established by electromagnetic energy applied to said photoconductor element and being sustained by an electric field across said photoconductor element, means for modulating said first electron beam and for scanning said bombardment-induced-conductivity element with said modulated electron beam at a first frequency, and means for scanning said photoconductor element with said second electron beam at a frequency different from said first frequency, and means for deriving output electrical signals from said tube in accordance with said states of conductivity in said photoconductor element.

References Cited in the file of this patent

UNITED STATES PATENTS

| | | |
|---|---|---|
| 2,787,724 | Webley | Apr. 2, 1957 |
| 2,833,958 | Pensak | May 6, 1958 |
| 2,850,657 | McNaney | Sept. 2, 1958 |
| 2,861,206 | Fiore et al. | Nov. 18, 1958 |
| 2,945,973 | Anderson | July 19, 1960 |
| 2,979,633 | Harris | Apr. 11, 1961 |
| 2,989,659 | McGee | June 20, 1961 |
| 3,046,431 | Nicholson | July 24, 1962 |